United States Patent [19]

Montague et al.

[11] Patent Number: 5,504,589
[45] Date of Patent: Apr. 2, 1996

[54] SYSTEM AND APPARATUS FOR TRANSMITTING FOOD ORDERS TO A CENTRAL STATION

[76] Inventors: Charles E. Montague, 606 Margret Pl., Elgin, Ill. 60121; William Pope, 270 Arden Shore Rd., Lake Bluff, Ill. 60044

[21] Appl. No.: 173,753

[22] Filed: Dec. 27, 1993

[51] Int. Cl.⁶ ................................................. H04N 1/00
[52] U.S. Cl. .................................................. 358/403
[58] Field of Search .................... 358/254; 379/436, 379/419, 434, 441, 454, 376, 110, 90, 53; 345/169, 156; 340/825.19, 825.28, 825.29

[56] References Cited

U.S. PATENT DOCUMENTS

| | | | |
|---|---|---|---|
| 4,074,793 | 2/1978 | Yuter | 186/1 R |
| 4,306,388 | 12/1981 | Yuter | 52/6 |
| 4,388,689 | 6/1983 | Hayman et al. | 364/401 |
| 4,415,065 | 11/1983 | Sandstedt | 186/39 |
| 4,518,821 | 5/1985 | Yuter | 179/2 R |
| 4,569,421 | 2/1986 | Sandstedt | 186/39 |
| 4,694,486 | 9/1987 | Yuter | 379/110 |
| 4,722,053 | 1/1988 | Dubno et al. | 364/401 |
| 4,734,789 | 3/1988 | Smith | 345/173 |
| 4,800,438 | 1/1989 | Yuter | 358/254 |
| 4,912,640 | 3/1990 | Tsugei | 364/400 |
| 5,063,600 | 11/1991 | Norwood | 382/13 |
| 5,148,155 | 9/1992 | Martin et al. | 340/712 |
| 5,157,737 | 10/1992 | Sklarew | 382/13 |
| 5,231,381 | 7/1993 | Duwaer | 340/712 |

OTHER PUBLICATIONS

"Micros HHT" (Micros Systems, Inc. Beltsville, MD) 1993.
"Innovatech Telepath" (Innovatech, San Francisco, California) 1993.
"Sable System Ninety" (Sable Technologies, Inc., Foster City, CA) 1991.
"Touch Mate Visage" (Visage, Framingham, MA) 1992.
"Compuadd Touch Screen Point of Sale System" (Compuadd, Austin, Texas) 1993.
"Real People. Real–World Solutions" (Business Applications Engineering, Ft. Lauderdale, Florida) 1993.
"Penview System" (Norand Corp., Cedar Rapids, IA).
"Penview 386 Pen Based Computer" (Norand Corp., Cedar Rapids, IA) 1993.
"Norand RT/DT1700 Radio Data Terminal" (Norand Corp., Cedar Rapids, IA) 1993.
"Nikko IR (Infrared) Communicator".
"The Pen Development Kit" (Touch Technology, Austin, Texas) 1993.
"EHT–30 Handheld Computer", Seiko Epson Corporation, Nagano, Japan (undated).

*Primary Examiner*—Edward L. Coles, Sr.
*Assistant Examiner*—Jerome Grant, II

[57] ABSTRACT

A portable unit for transmitting food orders to a central station includes a processor and a storage device coupled to the processor. The storage device contains product information identifying a list of food items. Input keys are coupled to the processor and operate to transmit selector signals to the processor identifying user determined ones of the food items on the list. A facsimile input screen coupled to the processor operates to transmit handwritten modifier information associated with selected ones of the selector signals to the processor. A display controlled by the processor displays product information from the list associated with the respective selector signals and the handwritten modifier information. A wireless communication system is coupled to the processor and transmits a composite food order including a first portion indicative of the selector signals and a second portion indicative of the associated hand-written modifier information to another location.

7 Claims, 12 Drawing Sheets

SYSTEM AND APPARATUS FOR TRANSMITTING FOOD ORDERS TO A CENTRAL STATION

BACKGROUND OF THE INVENTION

This invention is directed to an improved system for transmitting food orders to a central station. The embodiment described below is adapted for use by a food server in transmitting food orders to a central kitchen, and this embodiment allows modifying information to be incorporated into a food order simply and reliably.

A number of food ordering systems are presently available which include a network that allows a food server to communicate with the central kitchen. The prior art ordering systems of which the present inventors are aware include a hand-held unit which is connected by a wireless transceiver to a central station. The hand-held unit includes keys and displays which the food server uses to enter a food order. The food order is then transmitted via IR or RF techniques to the central station, which prints the food order at the kitchen, and prepares appropriate billing documents.

In the past, it has been conventional to assign code numbers to individual food items, such that the food server can enter a desired item simply by entering the associated code. This approach reduces data entry time, but it brings with it a significant disadvantage related to the recurrent need of the food server to modify the food order. For example, it is often necessary to designate how meats are to be cooked and how salads or drinks are to be prepared. In principle, it would be possible to provide a separate code for each such modifier. However, in many applications this unnecessarily multiplies the number of codes that must be memorized or looked up by the food server.

The present invention is directed to an improved system which allows such modifying information to be incorporated into a food order or other list in an efficient manner.

SUMMARY OF THE INVENTION

According to this invention, a portable device is provided for transmitting food orders to a central station. This portable device comprises a modular, hand-held unit comprising a processor and a storage device containing product information identifying a list of food items. Input keys are coupled to the processor and are operative to transmit a plurality of selector signals to the processor identifying user determined ones of the food items on the list. A facsimile input screen is coupled to the processor and operates to transmit hand-written modifier information associated with selected ones of the selector signals to the processor. A display is controlled by the processor to selectively display product information from the list associated with the respective selector signals and the associated hand-written modifier information. A wireless communication system is coupled to the processor for transmitting a composite food order comprising a first portion indicative of the selector signals and a second portion indicative of the associated hand-written modifier information to another location.

The embodiment described below is adapted for use in a food ordering system for communicating between a food server and the kitchen. The remote location includes a wireless receiver coupled to a system processor to receive the food order and to display a message at a kitchen that incorporates the food order, including the hand-written modifier information, for use at the kitchen.

The system described below efficiently combines data entry via keys with hand-written data entry to produce a composite file in an efficient manner that does not require the user to memorize or look up an unduly large number of codes. In this way, the user's task is simplified and yet the central station is provided with all required information.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
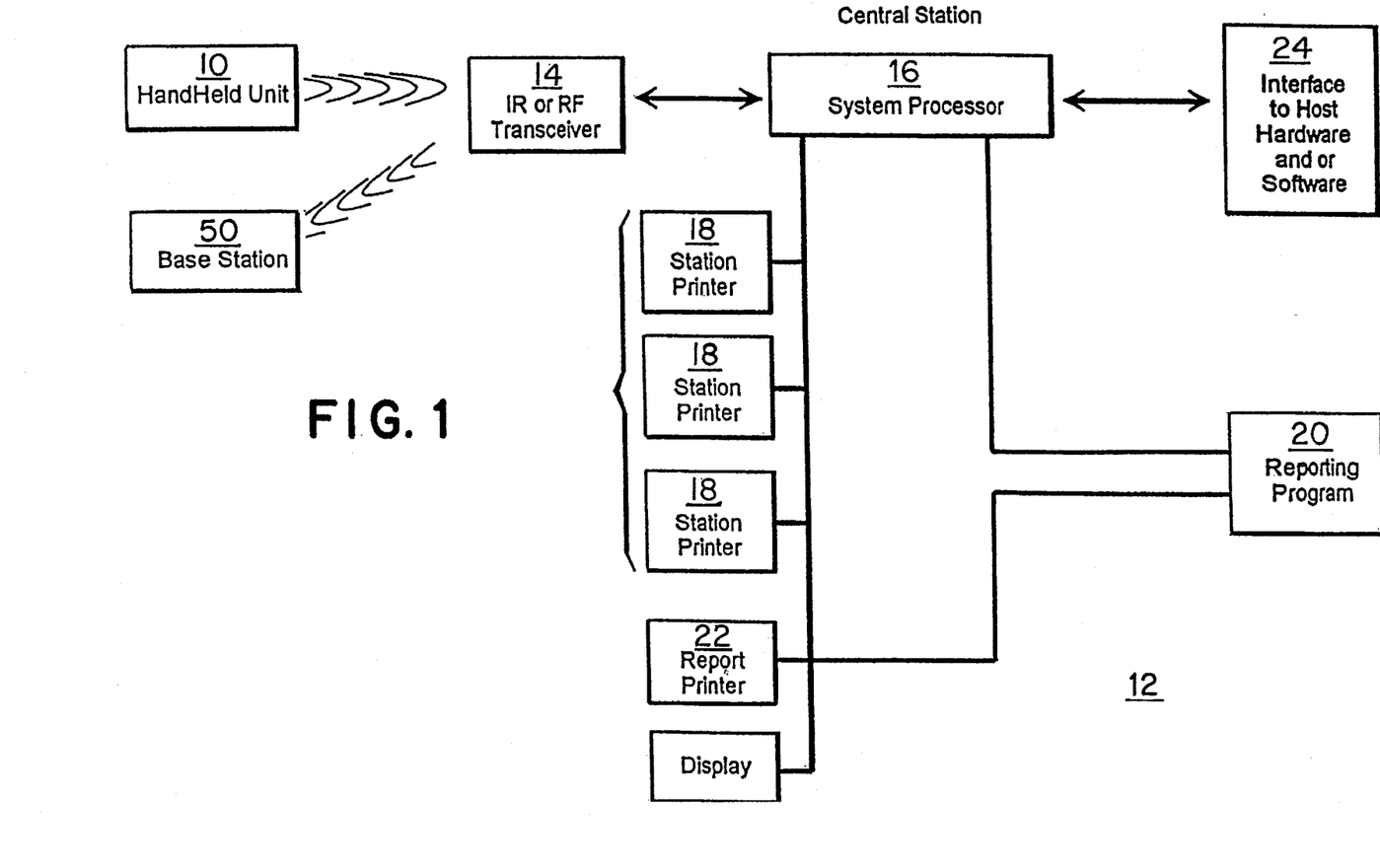
FIG. 1 is a block diagram of a food ordering system that incorporates a presently preferred embodiment of this invention.

Turning now to the drawings, FIG. 1 shows an overall block diagram of a food ordering system which incorporates a presently preferred embodiment of this invention. The illustrated food ordering system includes multiple hand-held units 10 and a base station 50 which are in wireless communication with a central station 12. As described in greater detail below, the hand-held units 10 and the base station 50 are used by food servers to enter food orders and to transmit these food orders to the central station 12. The hand-held units 10 and base station 50 are preferably in wireless communication with the central station 12, and many alternate techniques may be adapted to this purpose. Conventional infrared (IR) and Radio Frequency (RF) transceivers are suitable. Further details of the construction of the hand-held units 10 and the base station 50 are provided below in conjunction with FIGS. 2–4.

The central station 12 includes a transceiver 14 that receives information from and sends information to the hand-held units 10 and the base station 50. The transceiver 14 is connected to a system processor 16 which operates as described below to print food orders on respective station printers 18. Typically, the station printers 18 are located at appropriate positions in the kitchen, for example, at the salad preparation station, the dessert preparation station, and the bar. The system processor 16 also supplies order information to a reporting program 20, which on command prints summary reports on a report printer 22.

The system processor 16 is the main processor of the network. It automatically strips post menu data, provides interpretive codes for signal transmission, stores order data, directs order traffic to appropriate printers, collects information for summary printouts, and in general, operates as the host processor.

The station printers 18 are, in this embodiment, graphics capable printers which present not only alphanumeric data, but also images derived from digitizers included on the hand-held units 10. More than 50 printers can be daisy-chained on the network, and as explained below, demultiplexers insure that data intended for specific station printers 18 are properly routed.

The report printer 22 can be any suitable printer, such as a dot matrix printer or a laser printer. The system processor 16 cooperates with the reporting program 20 to compile data of daily activity, and to print this compiled data on the report printer 22. In addition, specific user-defined reports can be created and automatically printed as well.

If desired, the system processor 16 can be interfaced to additional host software and/or hardware as shown in block 24. Preferably, this interface is via generic ASCII text format to facilitate linkage between the system processor 16 and other systems. In this way, the system shown in FIG. 1 allows users to add a wireless array of hand-held units 10 without replacing any currently installed automated equipment.

Figure 2:
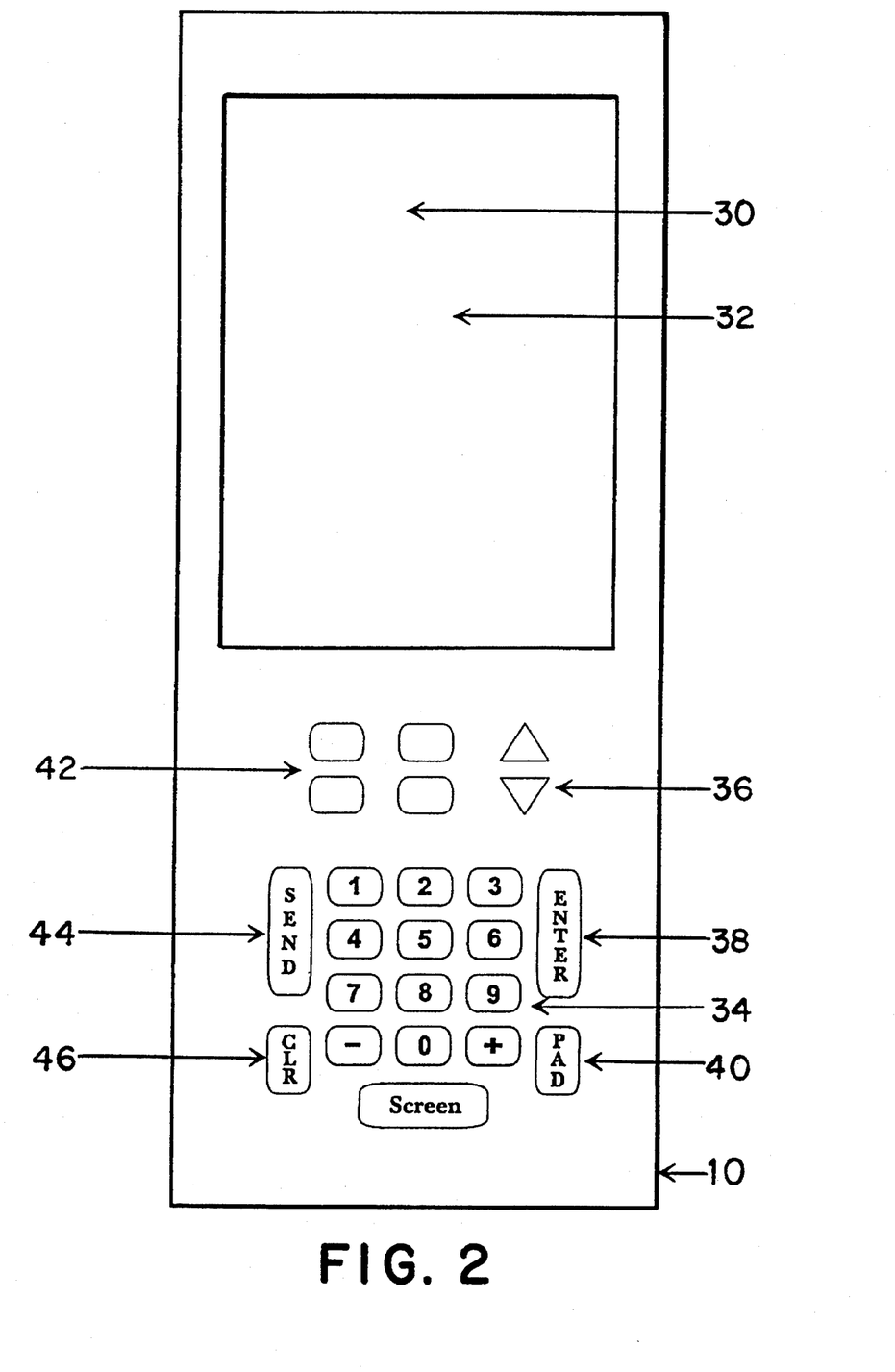
FIG. 2 is a plan view of one of the hand-held units of FIG. 1.

FIG. 2 shows a plan view of one of the hand-held units 10. This hand-held unit 10 is modular and portable, and it includes a variety of input and output devices. These input/output devices include a display 30 that can be a backlit liquid crystal display which is used for displaying both alphanumeric characters and facsimile information.

In this embodiment the display 30 is situated beneath a digitizer 32 that is transparent such that the underlying display 30 can be seen through the digitizer 32. The digitizer 32 operates in the conventional manner to allow a user to enter handwritten notes in facsimile as described below.

The hand-held unit 10 also includes a number of input keys including a numerical key pad 34 and an array of control keys. The control keys are conductive rubber which vary in size and tactile feedback. The scroll keys 36 can be used to move a cursor along display lines, and the enter key 38 can be used to enter any selected display line and include the selected item in a food order. Alphabetic keys can be included if desired.

The pad key 40 activates the digitizer 32 and is used by user to add handwritten modifier information in facsimile to a food order as described below.

The function keys 42 allow the user to select print, payment, beverage and food program modules that allow the user to print a check, enter payment information, order beverages, or order food with the hand-held unit 10.

The send key 44 allows the user to send the food order to the central station 12, and the clear key 46 allows a user to clear an entry.

The function keys F1 and F2 are programmable, and can be used to initiate programmed functions appropriate for particular applications.

The hand-held unit 10 described above can be packaged in many ways to accommodate various user environments. The system can use other types of input/output devices, including voice recognition devices and touch screens if desired. By positioning the digitizer 32 over the display 30 the size of the hand-held unit 10 is minimized. Of course, alternative embodiments may position the display and the keyboard on one side of a folded booklet and the digitizer on the other.

Figure 3:
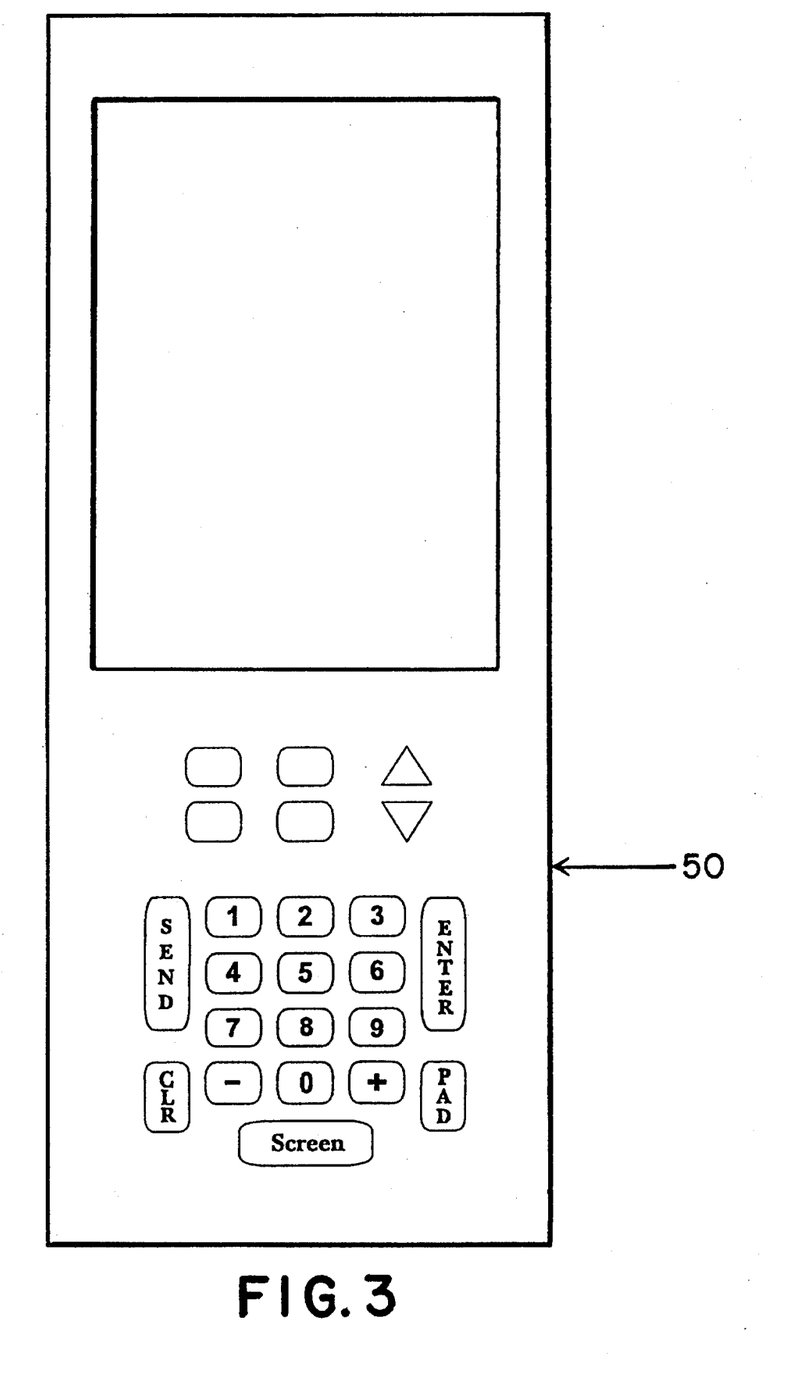
FIG. 3 is a plan view of the base unit of FIG. 1.

FIG. 3 is a plan view of a base station 50 which can be substituted for one of the hand-held units 10. The base station 50 provides the same features and functions as the hand-held unit 10, mounted in a tabletop configuration. Because it is tabletop mounted, an enlarged battery pack or a fixed power supply can be used to increase the power capability of the transceiver included in the base station 50. If desired the base station 50 and some of the hand-held units 10 can be hard wired to the central station 12, thereby eliminating the need for transceivers.

Figure 4:
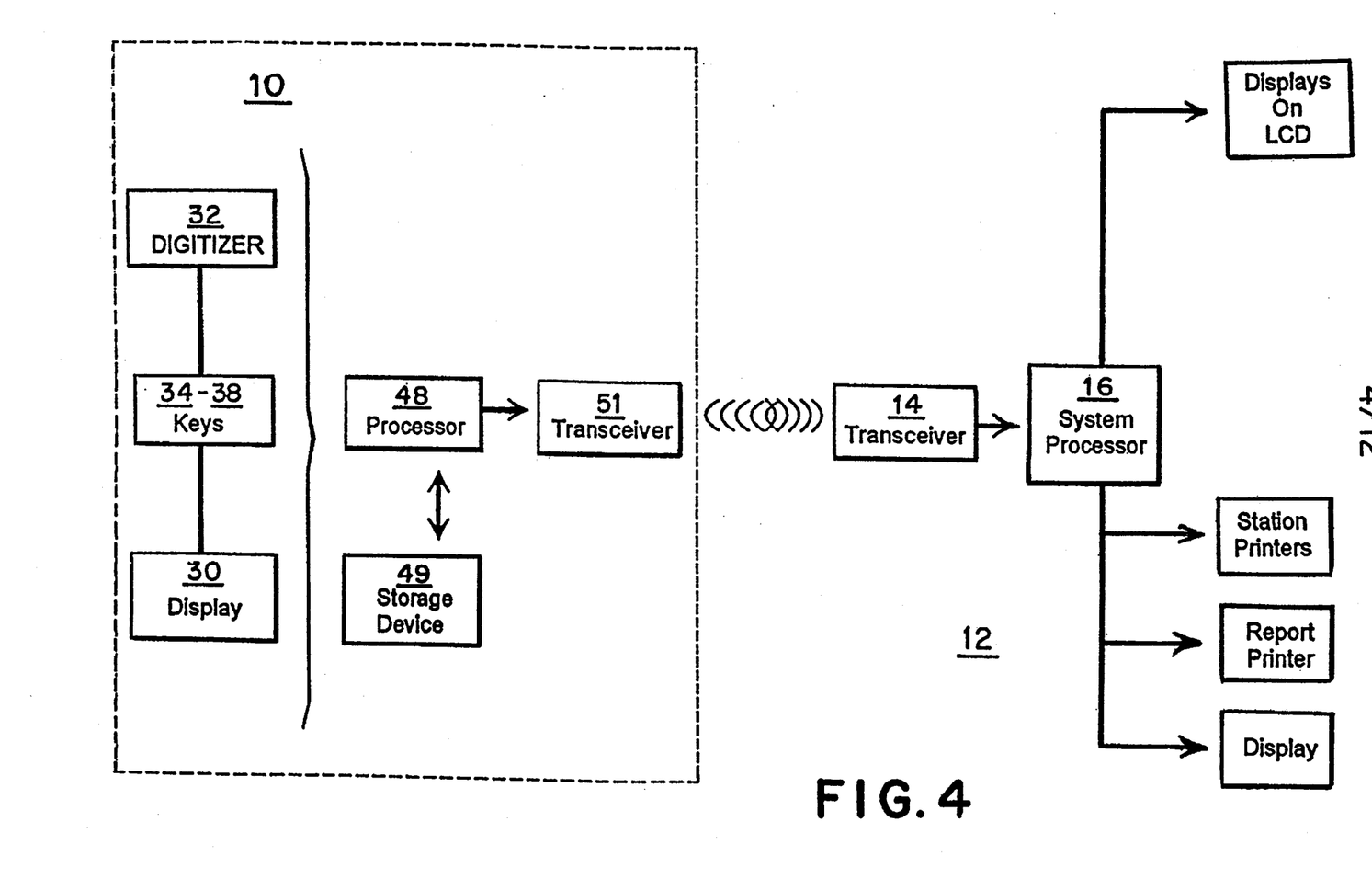
FIG. 4 is another block diagram of the system of FIG. 1 in somewhat greater detail.

FIG. 4 shows a block diagram of the system of FIG. 1 in somewhat greater detail. The keys 34–38 are used by a user to generate selector signals that may, for example, identify food ordering information and to supply these selector signals to the processor 48. The processor 48 is connected to a storage device such as a memory 49. This memory 49 stores product information identifying a list of products such as menu items. The user can command the processor 48 to display this list of products on the display 30, and can then use the scroll keys 36 and the enter key 38 to generate selector signals appropriate to the selected products. Alternately, the user can simply enter selector signals identifying appropriate products via the numerical keypad 34.

Additionally, the user can enter handwritten modifier information such as food modifier information via the digitizer 32. As explained below, this handwritten modifier information is associated by the processor 48 with the respective selector signals. The processor 48 also displays on the display 30 product information, such as food identifier information associated with the selector signals, and the associated modifier information.

The processor 48 creates a composite file which, in this example, is a food order composite file that has a first portion including the selector signals that identify specific menu items and a second portion that indicates the handwritten modifier information. This composite file is transmitted to a transceiver 51 and the transceiver 51 transmits the composite file to the transceiver 14 of the central station 12.

The various input and output devices connected to the processor 48 are governed by the installed software base which can be easily be modified to accommodate various environments and user requirements. The processor 48 can, for example, be a 68000 Series Motorola CPU which is programmed to control the flow of information to and from the hand-held unit 10 and the central station 12 as explained above. It is well known by those skilled in the art how to program the processor 48 to decode keypad entries, decode and convert hand-written entries, relate a cursor to displayed options, format data for storage and transmission, monitor the transceiver 51 for duplex traffic, and download new programs or update new menus.

The transceivers 51, 14 provide the communication link between the hand-held units 10 and the central station 12. The transceivers 51, 14 can use a daisy-chain interconnect technique to minimize cabling requirements. The location and the number of the required transceivers will vary depending upon the application.

Figure 5:
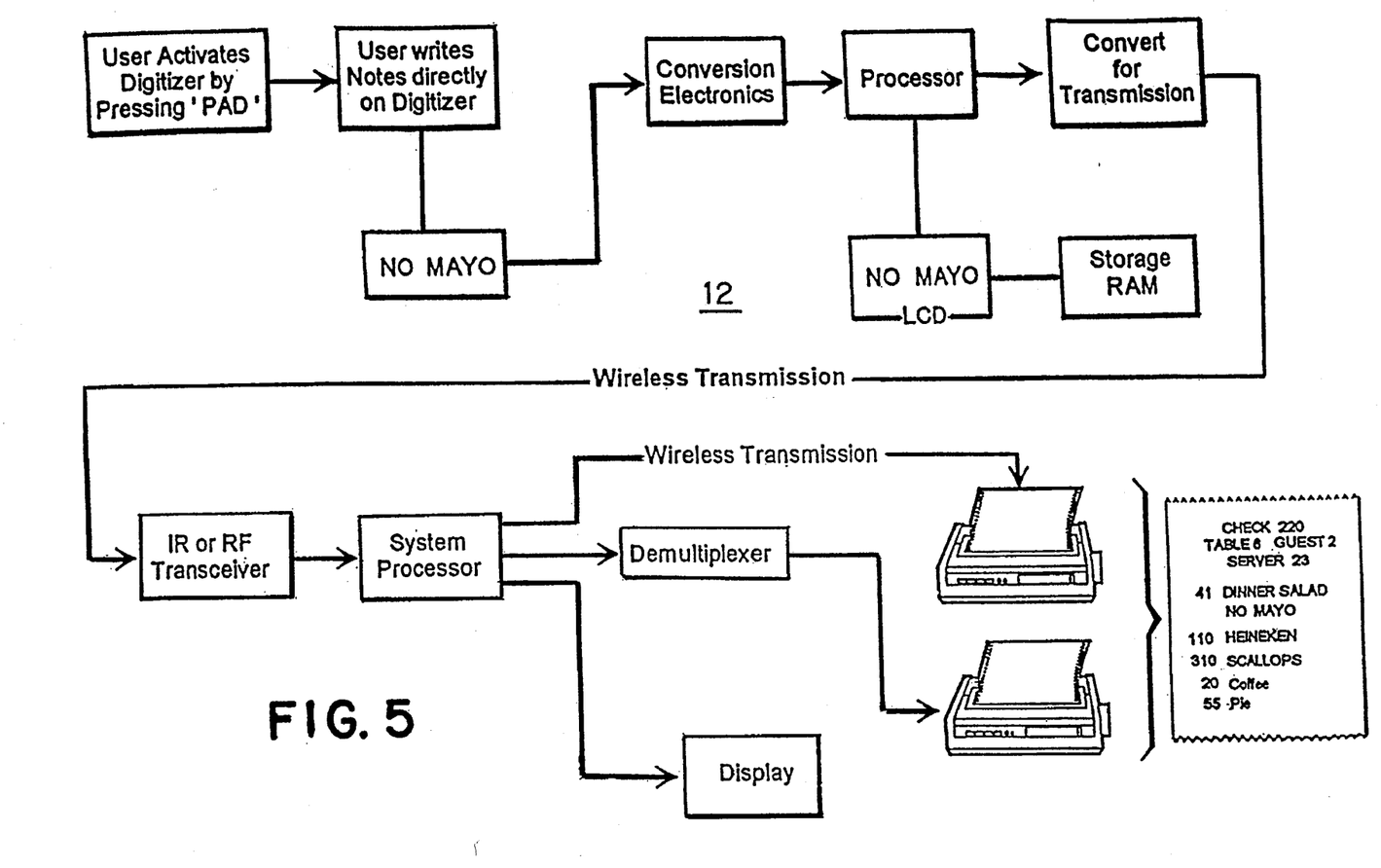
FIG. 5 is a flow diagram illustrating aspects of the operation of the system of FIG. 1 in creating, transmitting, and displaying the food order.

FIG. 5 is a flow chart illustrating the use of the digitizer 32. The user first activates the digitizer by pressing the pad key described above. The user then writes notes directly on the digitizer. In the example of FIG. 5 the note on the digitizer is "NO MAYO". As the note is written, it is converted in facsimile to CPU input format by conversion electronics and the processor 48 (FIG. 6) then displays the facsimile image on the display 30 and stores the facsimile image data for use in creating the composite file described above.

When the user presses the send key, the composite file is converted to the appropriate transmission protocol and sent via the transceivers 51, 14 (FIG. 4) to the central station 12 where it is received by the system processor 16. The processor 16 performs routine data storage and writing tasks, and it also prepares order data for printout or display. Each item on the composite file is scanned to detect any user defined destination code. The central station 12 then sends order data to either a printer or a display device. The resulting printout or display presents both the computer generated order text and each hand-written modifier which pertains to any or all of the ordered items. For example, as shown in FIG. 5, order item 41 (DINNER SALAD) is printed along with the associated hand-written information (NO MAYO). In this way, food items which have been designated by selector signals are displayed in the kitchen along with the respective hand-written information containing modifier information needed by the kitchen in preparing the associated menu item.

Figure 6:
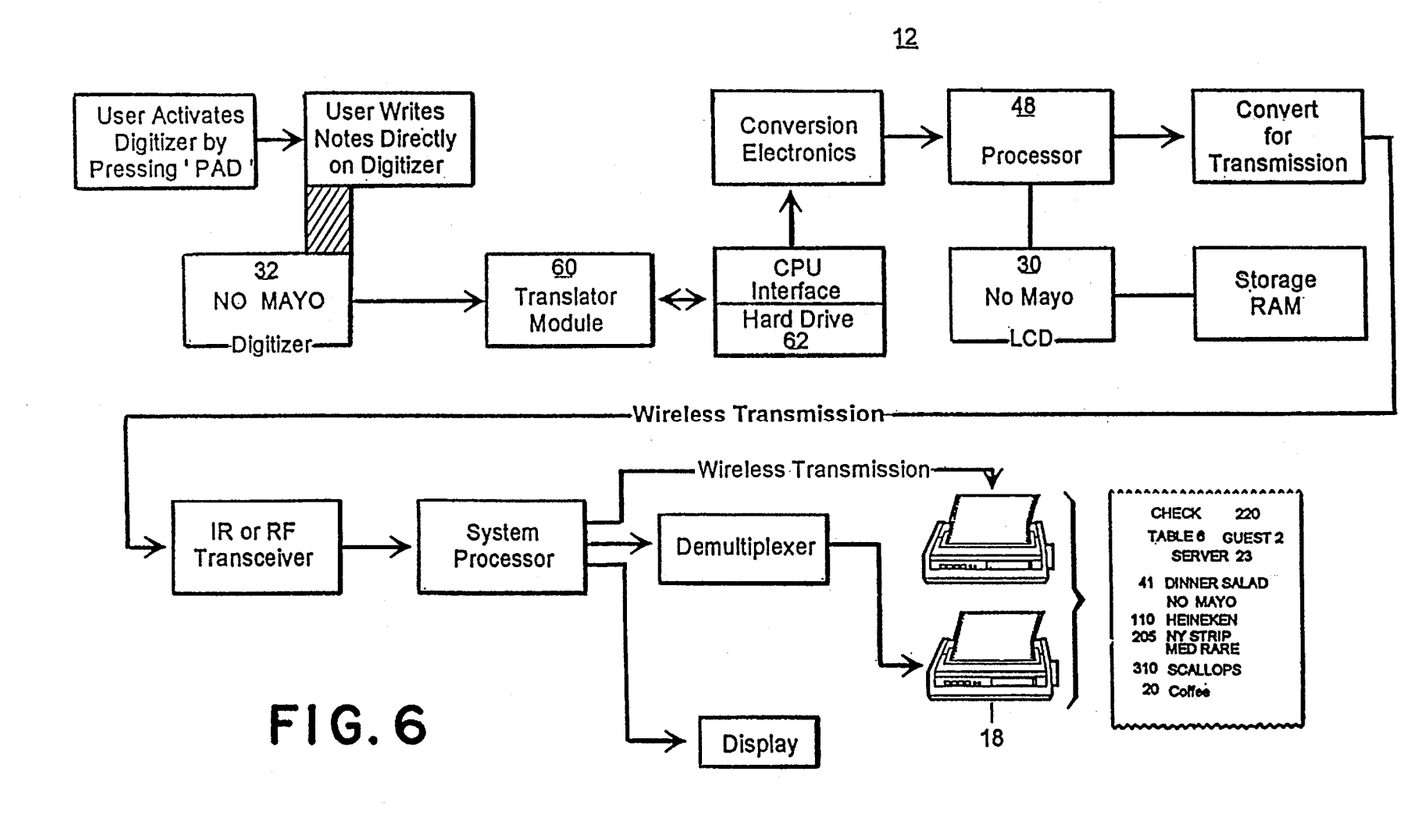
FIG. 6 is a flow diagram corresponding to FIG. 5 of an alternative embodiment of this invention.

FIG. 6 shows a modified embodiment of this invention which is in many ways similar to the embodiment in FIG. 5. However, in this modified form of the invention, the base station 12 includes a translator module 60. The translator module 60 retrieves the file of the particular server and matches handwritten entries with records stored in the hard drive 62. The translator module 60 then translates the handwritten entries into a text format, and the text data is sent to the conversion electronics for transmission to the processor 48.

The system of FIG. 6 works identically to the system of FIG. 5, except that the hand-written modifier information is displayed on the display 30 and printed on the printer 18 in a standard computer font rather than in facsimile. However, the function performed is the same, because the user enters this modifier information in hand-written form, and it is presented at both the base station 12 and the kitchen in a readable format.

Figure 7:
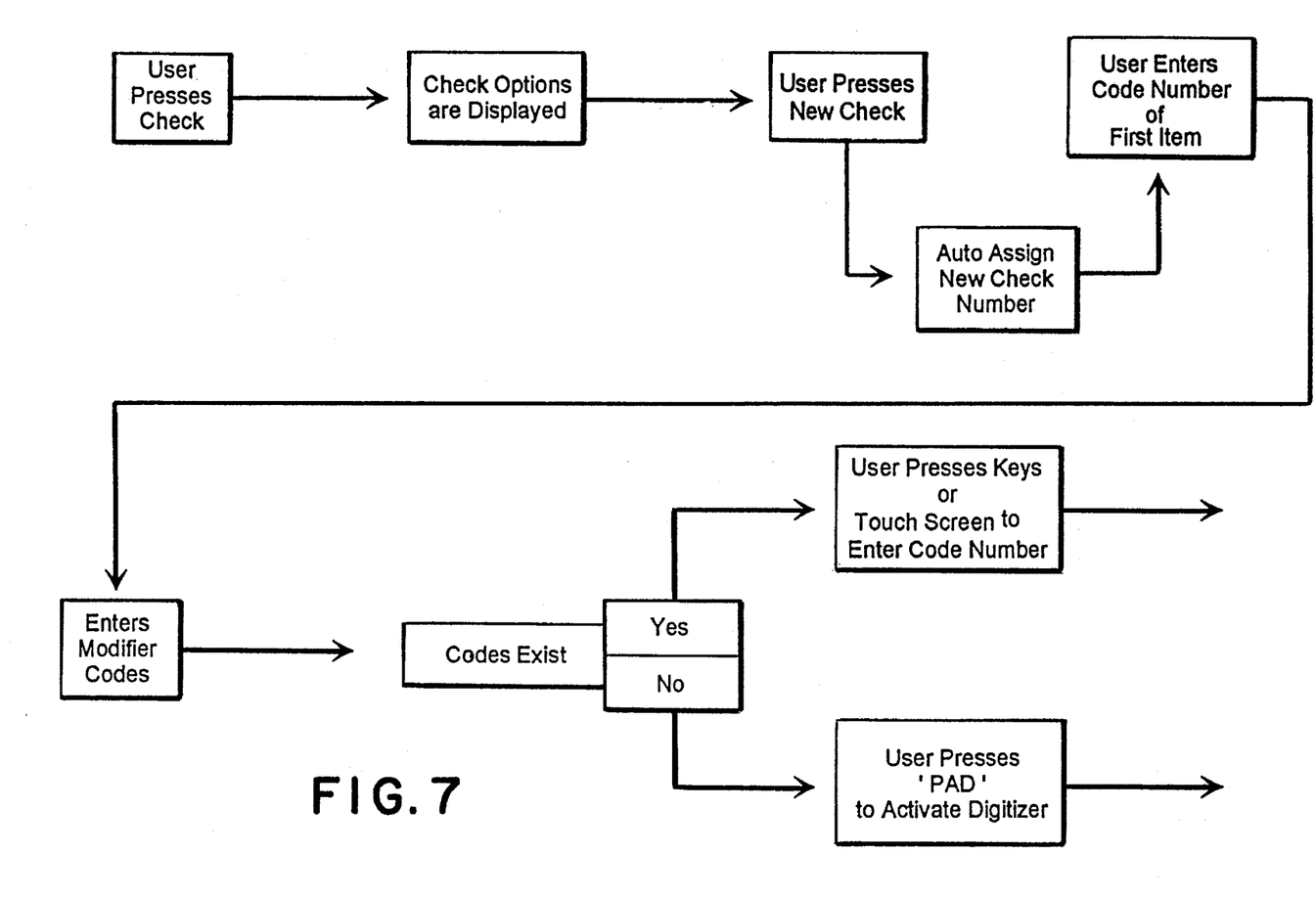
FIGS. 7 and 8 combine to form a flow diagram joining the manner in which the system of FIG. 1 is used to create a food order.
Figure 8:
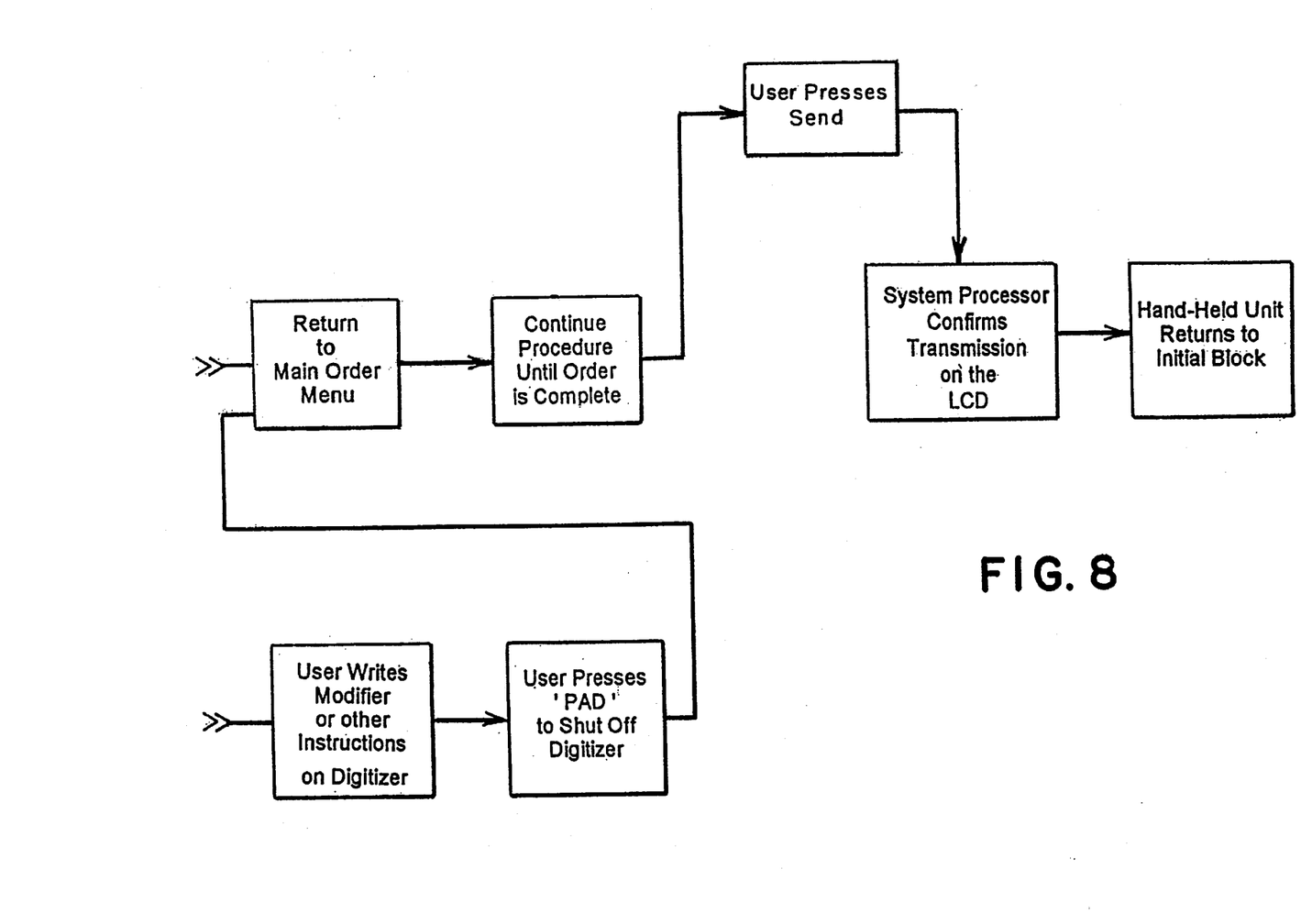

FIGS. 7 and 8 combine to form a flow-chart showing the manner in which a food server can use a remote unit 12 to generate a food order. The user begins the process by pressing a key to initiate a new check. This key can, for example, be the F1 key of FIG. 2. The hand-held unit 10 then displays check options including all open checks and the option to start a new check. The user uses the scroll keys and the enter key to review any check, or in this case to start a new check with the new check option. The hand-held unit 10 then automatically assigns a new check number, which can be tied either the individual hand-held unit 10, or to the overall system.

After a new check number is signed, the hand-held unit is ready to accept keypad entries of a code number identifying a first item such as a first menu item. When a recognized number is entered, the description and price of the item is displayed. This information is stored in the storage device shown in FIG. 4. If the displayed information corresponds to the intended item, the user presses the enter key to confirm, and the appropriate selector signal is included by the processor in the food order.

If the user wishes to modify a selected item, a suitable key such as the F2 key can be used to call up a list of modifier codes. The user can add the desired modifier to the previously selected food item with appropriate keys on the keyboard. When the modifier entries are complete, the system returns to the input screen. This screen shows the previously selected item or items. If the user designates an item, the screen will display that item and all modifiers.

If a desired modifier code does not exist, the user can then press the pad key to activate the digitizer. Once activated, the digitizer is available for direct operator entry of handwritten notes. For example, the user can write cooking or preparation instructions and these facsimile entries are displayed directly on the display of the hand-held unit. When the entry of a handwritten modifier is complete, the user presses the pad key again, which shuts off the digitizer and returns the hand-held unit to the input screen. Once a handwritten note has been entered, if the operator designates a previously entered item, the handwritten modifier, as written, will be displayed. As pointed out above, the system can be configured to display hand-written modifiers in text format.

The procedures described above for taking orders continue until the initial table order is complete. Once complete, the operator presses the send key. The hand-held unit will then attempt immediate transmission of the order data, including both selector signals identifying particular menu items and the handwritten modifier information providing additional food preparation instructions. If no contact is made with the central station, the hand-held unit will continue transmission attempts until a link is established and the order is sent.

The central station 12 checks all incoming transmissions for transmission errors. If error checking detects an incomplete transmission, the central station will request retransmission. If no errors are detected, the central station sends a confirmation to the originating hand-held unit. A confirmation of receipt enables the hand-held unit to return to the default state in which it is ready to initiate the operations of FIG. 7.

Figure 9:
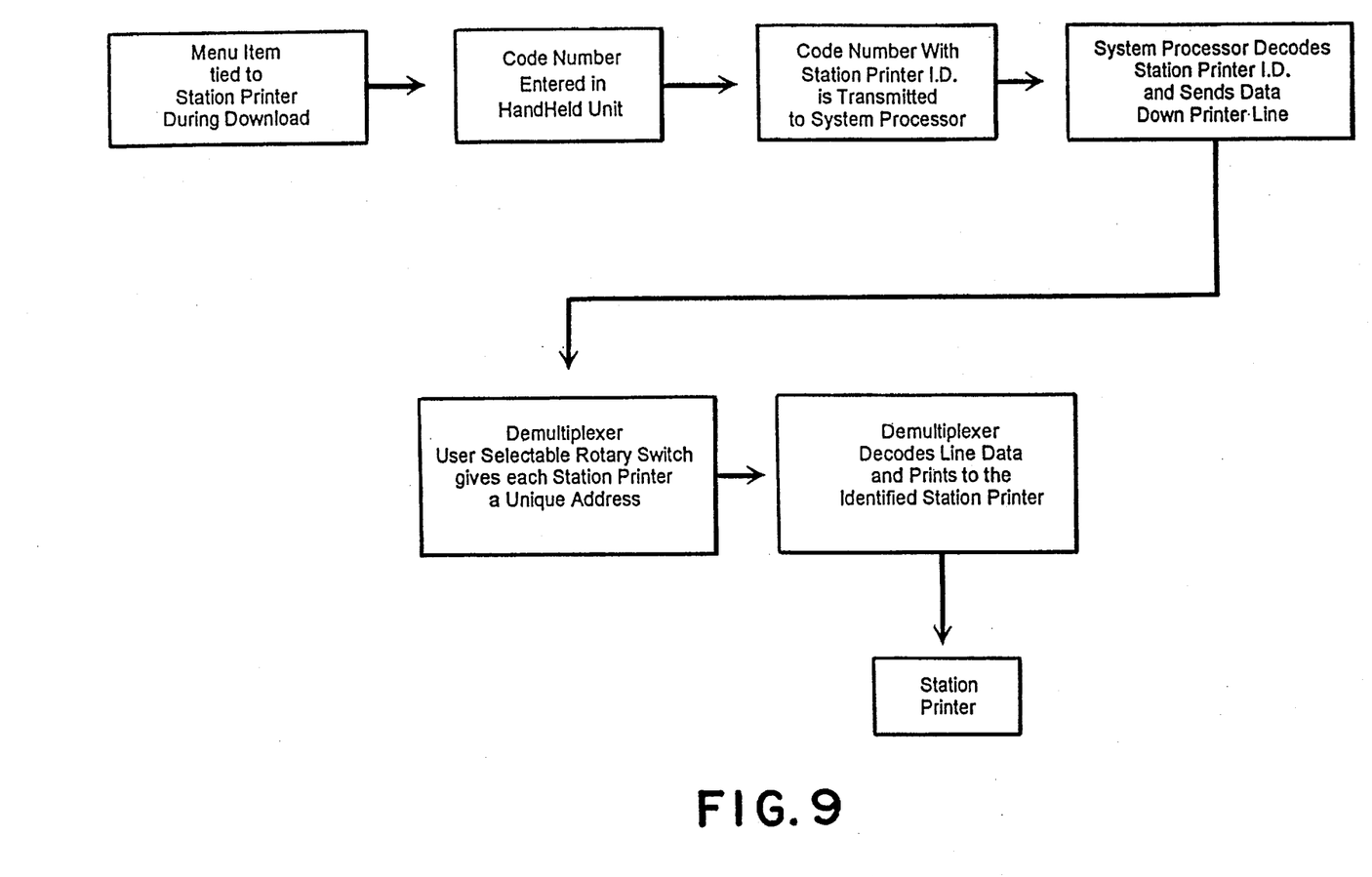
FIG. 9 illustrates the manner in which the system of FIG. 1 can be used to transmit specific menu item orders to specific station printers.

The system described above allows orders to be transmitted to the appropriate printers or displays designated during the setup routine. As shown in FIG. 9, specific menu items can be tied to or associated with the specific station printers when the program is down-loaded to the hand-held unit 10. For example, there may be five station printers associated with the following five kitchen functions: salad preparation, bar, cold meal preparation, seafood preparation and dessert preparation. These codes are associated with the respective selector signals in a menu file stored in the storage device 49 (FIG. 4). These codes can be changed using the setup option in the operational software. When a user enters a selector signal with a hand-held unit or the base station, the station code is part of the selector signal and, as such, it is transmitted to the central station. The central station includes software required to direct incoming selector signals for food orders to the appropriate files, peripherals or other processing devices or systems. In the case of the printer system described above, the system processor 16 strips the destination code from each selector signal and then formats it as a prefix to the outgoing printer data.

Figure 10:
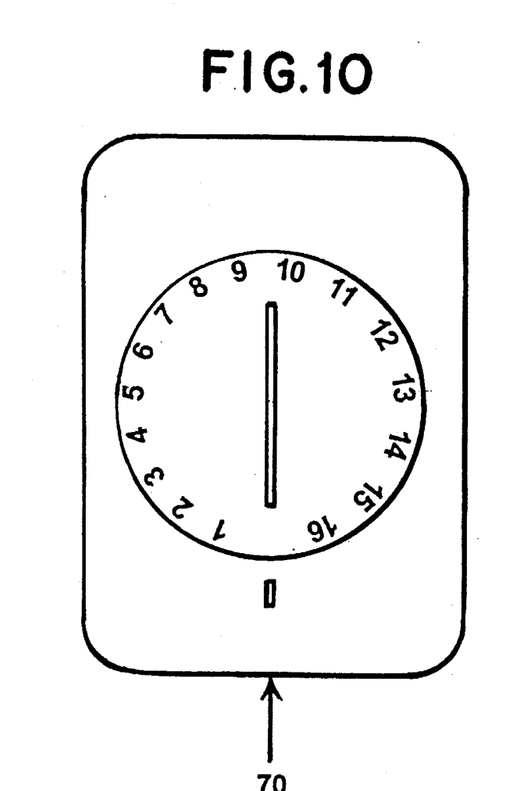
FIG. 10 is a front view of a demultiplexer suitable for use in the system of FIG. 1.
Figure 11:
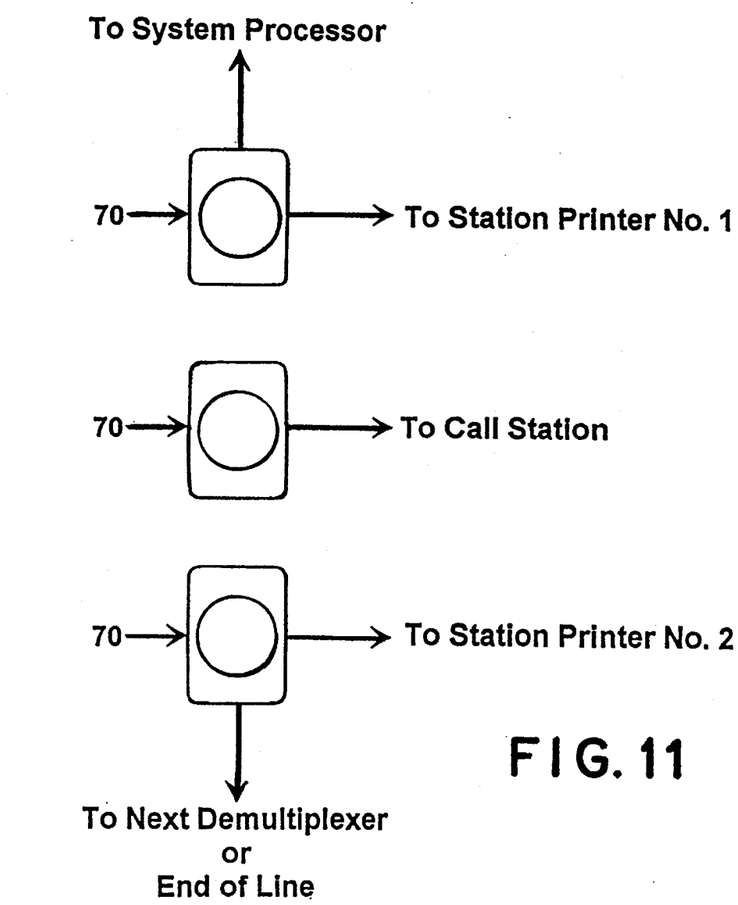
FIG. 11 is a block diagram illustrating the use of the demultiplexer of FIG. 10.

As shown in FIG. 11, each of the station printers is connected to the system processor via a respective demultiplexer 70. As shown in FIG. 10, each demultiplexer 70 includes a rotary dial that allows the user to select one of 16 addresses for that multiplexer. In this way, each station printer is provided with a unique address. During system setup the printers are positioned as appropriate at respective portions of the kitchen, and the demultiplexers 70 are set with the appropriate addresses. The demultiplexers 70 decode line data and print the appropriate order information at the respective station printers. The demultiplexers 70 route only those data streams which are prefixed with the specific address code to the respective printer. All other data streams are allowed to continue to the destination peripheral. As explained above, the station printers are fully graphic capable and in this way the printers are capable of presenting facsimile images derived from the digitizers on the hand-held units and base stations. The encoding and decoding procedures utilized in the printer system are also utilized in presenting address data for display on various other peripherals.

The demultiplexers 70 allow order traffic to be directed to exact preparation areas in a large kitchen, thereby eliminating the confusion and lost orders inherent in many single print station systems.

Figure 12:
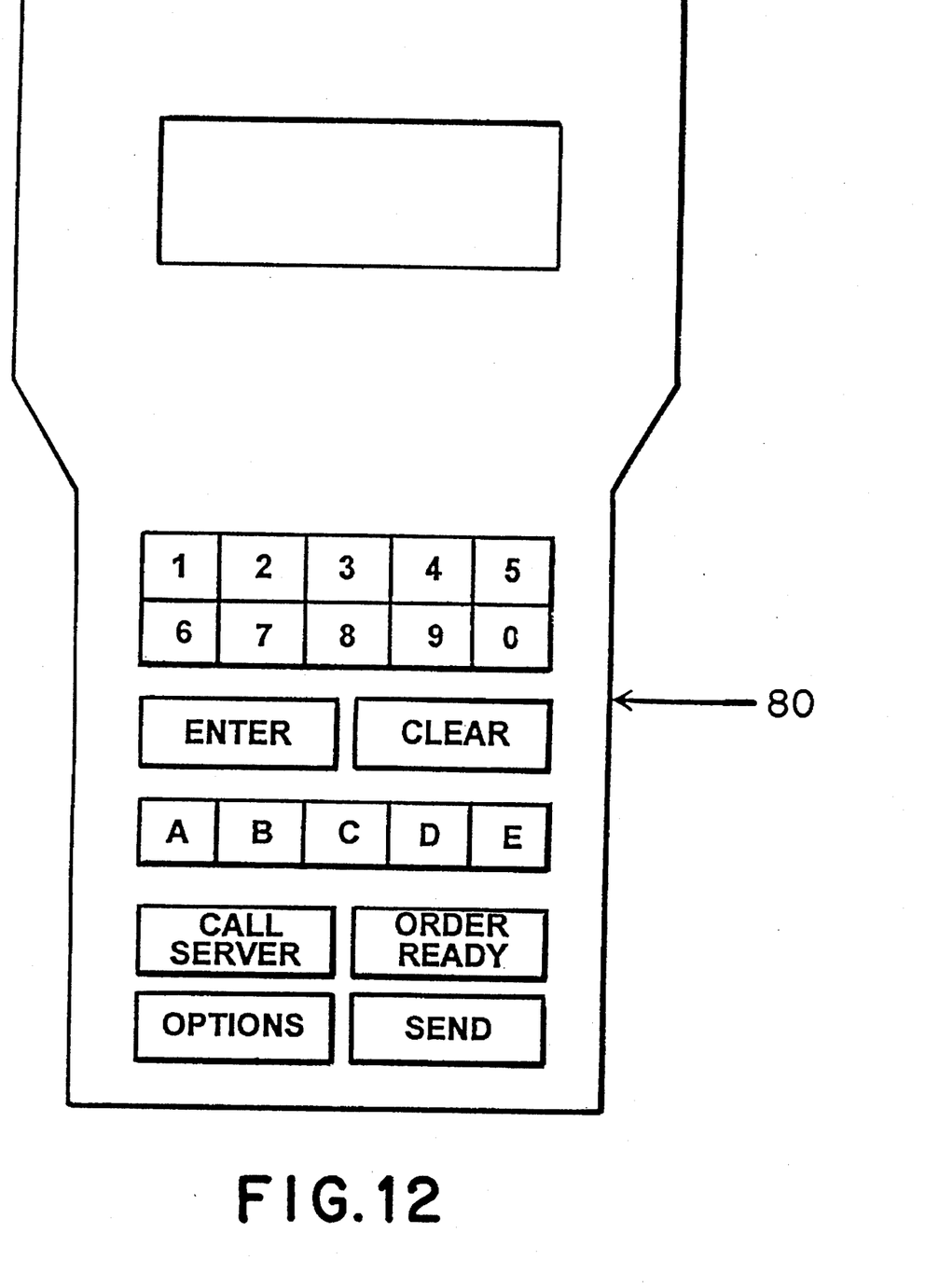
FIG. 12 is a plan view of a call station suitable for use with the system of FIG. 10.

FIG. 12 shows a front view of a call pad 80 which is used as an input device to a paging system. The call pad 80 performs three primary functions. First, when the call server button is pressed the call pad 80 will accept the number of a server to be paged. The order ready function is activated with the order ready button of the call pad 80, and it operates in much the same manner as the call server program described above. The main difference is that the call pad prompts the user for a ticket number instead of a server number.

The options key allows a number of alternative options as follows. One useful option is to allow an operator using the call pad 80 to broadcast food updates. In this way, the kitchen can alert servers to the quantity of food available. If a food item on the menu is out or running low, the kitchen can alert servers to this status by using an update module accessed via the options key. The status of the food item will be broadcast to all servers on the network, so that when a food server attempts to enter an order for an affected food item, the server will be immediately notified. In this way, a customer can promptly be notified of the situation and offered alternatives.

Another option is the reprint check function which enables the kitchen to reprint any check which has not been closed out. In the case of damaged or lost checks, this function enables the kitchen to continue to operate smoothly.

A third option is the call manager function which enables an address channel to a manager station or terminal. This function operates similarly to the call server function described above, except that it directs the page to a specific manager terminal, which can be either a hand-held unit or a base station.

Figure 13:
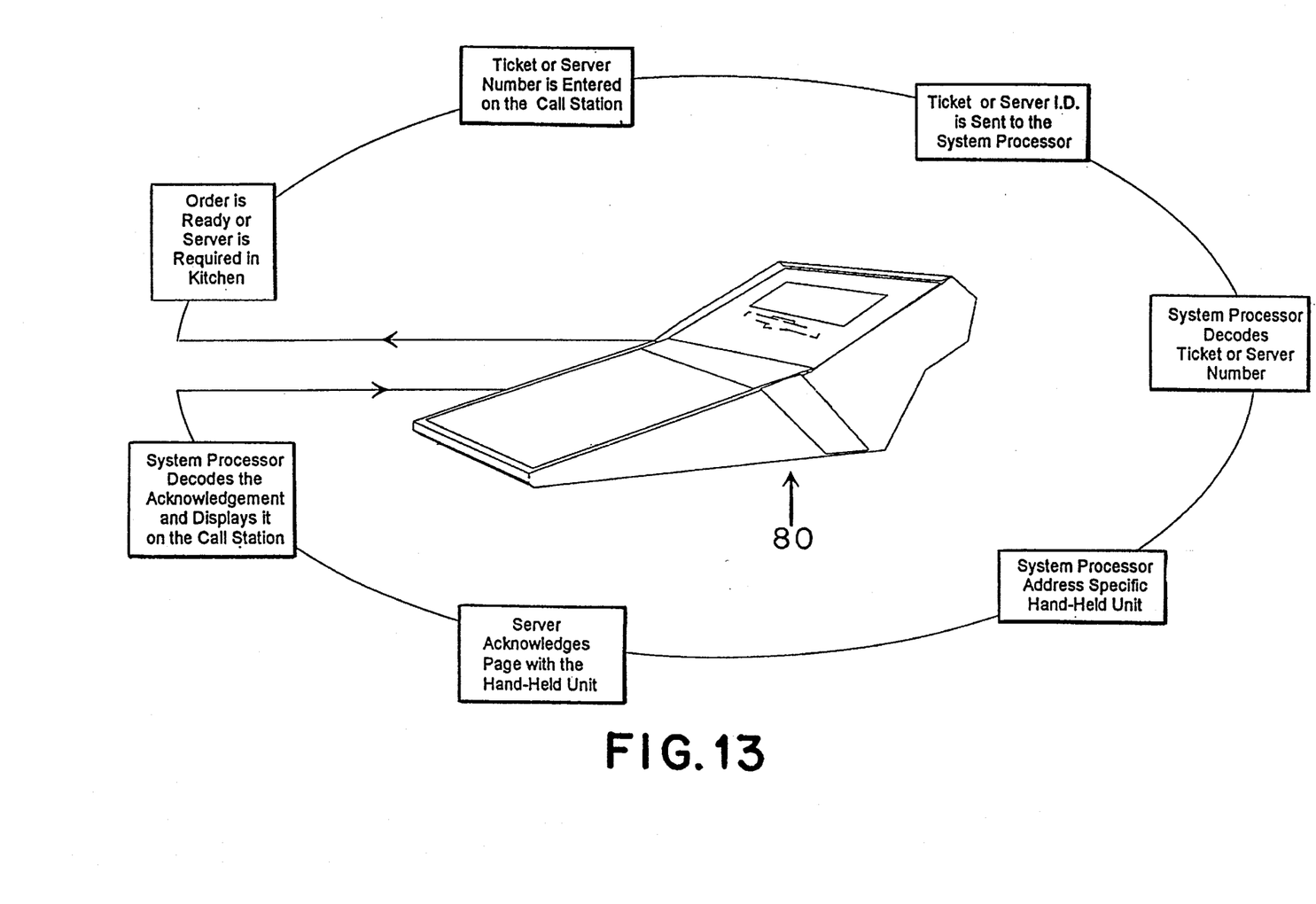
FIG. 13 is a flow diagram illustrating the use of the call station of FIG. 12.

FIG. 13 is a flow chart that illustrates operation of the call pad 80. When an order is ready or a food server is required in the kitchen, the call pad is used to enter the ticket or server number. The operator does this by pressing the call server key and entering the I.D. number for the server, or by pressing the order ready key and the appropriate ticket number. The bi-directional communications system between the system processor 16 and the station printers 18 transmits the call pad signal to the system processor 16. The system processor 16 decodes the call pad signal to determine the specific request. It then encodes the outgoing transmission with the correct address for the appropriate hand-held unit which either originated the ticket or is being carried by the server. The system processor then identifies the correct hand-held unit by searching its order and employee/terminal database. When a match is found, the outgoing transmission is encoded with an I.D. prefix and then broadcast over the system.

The addressed hand-held unit decodes the message and prompts the addressed user by flashing an indicator. The user presses an appropriate key to access, select and acknowledge receipt of the page. The encoded acknowledgement is then sent back to the system processor 16, where it is decoded and ultimately displayed on the display of the call pad 80. Several pages can be processed simultaneously since the system processor 16 has the capability to sort and display page traffic separate from standard communication cycles.

Those skilled in the art will recognize that a wide variety of hardware and software systems can be used to implement the functions described above. Simply by way of example, the following table provides information regarding suitable sources for various of the components described above. It is, of course, not intended that this information be construed as limiting the scope of this invention.

TABLE

| DESCRIPTION | MANUFACTURER | PART NUMBER |
| --- | --- | --- |
| System Processor 16 | Motorola | MC68349 |
| RF Transceiver 14, 51 | Proxim | RDA-300 |
| Digitizer 32 | Touch Technology | 4300-900-I63 |
| | Burr-Brown | ADS78D6 |
| Display 30 | Applied Display | LM12279 |

From the foregoing it should be apparent that the system described above allows a user such as a food server to integrate handwritten modifier information with selector signals that can be generated by keypads, touch screens or voice recognition. In this way, a composite file can be efficiently generated that contains the necessary modifier information, while simplifying the order entering process.

Of course, it should be understood that a wide range of changes and modifications can be made to the preferred embodiments described above. For example, this invention can be adapted for use in beverage ordering systems, and the term "food" as used herein is intended to cover beverages. It is, therefore, intended that the foregoing description be regarded as illustrative rather than limiting, and that it be understood that it is the following claims, including all equivalents, which are intended to define the scope of this invention.

We claim:

1. A food ordering system for communicating between a food server and a kitchen, said system comprising:

at least one food order display unit accessible to the kitchen and comprising a first processor;

a plurality of remote units, each comprising a second processor, a plurality of input keys coupled to the second processor and operative to transmit food ordering information to the second processor, a facsimile input screen coupled to the second processor and operative to transmit handwritten food modifier information in facsimile to the second processor, said food modifier information associated with selected food ordering information, said input keys being separate from and in addition to the facsimile input screen, a display controlled by the second processor to selectively display food identifiers associated with the food ordering information and the handwritten food modifier information, and a wireless communication system coupled to the second processor for transmitting a food order comprising the handwritten food modifier information;

a wireless receiver coupled to the first processor to receive said food order and supply said food order to the first processor; and an order transmitter controlled by the first processor to display a message that incorporates the food order including the handwritten food modifier information for use at the kitchen.

2. A portable unit for use by a food server in a food ordering system, said portable unit comprising:

a modular, hand-held unit comprising a processor;

a plurality of input keys coupled to the processor and operative to transmit food ordering information to the processor;

a facsimile input screen coupled to the processor and operative to transmit handwritten food modifier information to the processor, said food modifier information associated with selected food ordering information, said input keys being separate from and in addition to the facsimile input screen;

a display controlled by the processor to selectively display food identifiers associated with the food ordering information and the handwritten food modifier information; and a wireless communication system coupled to the processor for transmitting a food order comprising the handwritten food modifier information to a central station.

3. A portable unit for transmitting food orders to a central station, said portable unit comprising;

a modular, hand-held unit comprising a processor;

a storage device coupled to the processor and containing product information identifying a list of food items;

a plurality of input keys coupled to the processor and operative to transmit a plurality of selector signals to the processor identifying user determined ones of the food items on the list;

a facsimile input screen coupled to the processor and operative to transmit to the processor handwritten food modifier information associated with selected ones of the selector signals identifying user determined ones of the food items on the list, said input keys being separate from and in addition to the facsimile input screen;

a display controlled by the processor to selectively display product information from the list associated with the respective selector signals and the associated handwritten modifier information; and a wireless communication system coupled to the processor for transmitting a composite food order comprising a first portion indicative of the selector signals and a second portion indicative of the associated hand-written modifier information to another location.

4. The invention of claim 1 or 2 or 3 wherein the facsimile input screen is superimposed over the display, and wherein the facsimile input screen is sufficiently transparent to allow the display to be viewed through the facsimile input screen.

5. The invention of claim 1 or 2 wherein the food order further comprises a portion indicative of the food ordering information.

6. The invention of claim 1 or 2 wherein the food modifier information provides food preparation instructions related to said food ordering information.

7. The invention of claim 3 wherein the food modifier information provides food preparation instructions related to said selected ones of the selector signals.

* * * * *